United States Patent
Fox

(10) Patent No.: US 6,358,743 B1
(45) Date of Patent: Mar. 19, 2002

(54) CONTRABAND SUBSTANCES REFERENCE SAMPLE CARRIER

(75) Inventor: Francis T. Fox, Woodbridge, VA (US)

(73) Assignee: The United States of America as represented by the Secretary of Transportation, Washington, DC (US)

( * ) Notice: Subject to any disclaimer, the term of this patent is extended or adjusted under 35 U.S.C. 154(b) by 35 days.

(21) Appl. No.: 09/611,975

(22) Filed: Jul. 6, 2000

(51) Int. Cl.[7] .................................................. G01N 31/00
(52) U.S. Cl. ............................. 436/8; 436/19; 436/901; 252/408.1
(58) Field of Search ............................... 436/8, 19, 815, 436/816, 901; 252/408.1

(56) References Cited

U.S. PATENT DOCUMENTS 4,580,440 A * 4/1986 Reid et al. ................. 73/31.07
5,476,794 A * 12/1995 O'Brien et al. ............... 436/92
5,795,544 A * 8/1998 Matz ............................ 422/83

FOREIGN PATENT DOCUMENTS

DE 4439429 * 2/1996

* cited by examiner

*Primary Examiner*—Maureen M. Wallenhorst
(74) *Attorney, Agent, or Firm*—Otto M. Wildensteiner

(57) ABSTRACT

A carrier for contraband substances to be used as a reference for testing trace detection systems. The carrier, which has the consistency of hand cream and can be dispensed from a tube or a syringe, is inert with respect to the contraband substances and does not dissolve or degrade the plastics normally used for making luggage or computer disc cases. After the carrier (with added contraband substance) has been placed on a hard surface such as a plastic luggage handle and dried, the contraband substance can be sampled by wiping with a paper or cloth, which is then tested in a device that uses ion mobility spectrometry, gas chromatography, chemiluminescence, or a combination of these methods.

3 Claims, No Drawings

CONTRABAND SUBSTANCES REFERENCE SAMPLE CARRIER

STATEMENT OF GOVERNMENT INTEREST

The present invention may be made or used by or for the Government of the United States without the payment of any royalties thereon or therefor.

BACKGROUND

Trace detection machines are in common use at airports, prisons, immigration checkpoints, military bases, and embassies, among other places. They are used to detect trace quantities of explosives and contraband drugs on the surfaces of objects such as luggage, parcels, and clothing. The machines used for such detecting must be periodically tested to determine that the correct response is obtained. This testing serves as a measure of quality control for both the instrument and the personnel who do the sampling and testing.

However, the testing must use a carefully prepared reference sample that will produce a known and consistent response. This is done by having a known identity and quantity of a contraband substance in the test sample, otherwise the test is meaningless at best and misleading at worst. When doing this testing it is not feasible to put pure contraband substances directly on the surface of an object since the quantities involved are extremely small, typically nanogram amounts (i.e. trace amounts). At these levels the variation between amounts directly deposited could be as much as 10 to 1, with no way to determine the variation until the samples were analyzed.

One type of test involves wiping a surface suspected of being contaminated with drugs or explosives with a piece of cloth or paper. The cloth or paper is then tested in a device that uses ion mobility spectrometry, gas chromatography, chemiluminescence (thermal energy activation, or TEA), or a combination of these methods to detect the presence of drugs or explosives. In order to test and evaluate the entire system (hardware and operators) there must be a known quantity of a known substance on the surface which is picked up by the method specified by the hardware manufacturer. This requires that the contraband substance be in a form that allows it to be repeatably deposited on the surface and also repeatably removed from the surface by the cloth or paper.

In addition, when using an ion mobility spectrometer (IMS) as the detector, the carrier should be compatible with the positive ion mode as well as the negative ion mode so that both explosives and drugs can be tested for.

OBJECTS OF THE PRESENT INVENTION

Accordingly, it is an object of the present invention to provide a reference sample carrier for contraband substances.

It is a further object of the present invention to provide such reference sample carrier which can be prepared in advance and stored for extended periods of time.

It is a further object of the present invention to provide such reference sample carrier that does not degrade the contraband substances contained therein.

It is a further object of the present invention to provide such reference sample carrier that does not degrade the surfaces it is placed on.

It is a further object of the present invention to provide such reference sample carrier that can be prepared from off the shelf components.

It is a further object of the present invention to provide such reference sample carrier that has the consistency of hand cream and can be dispensed from a tube or a syringe.

It is a further object of the present invention to provide such reference sample carrier that can be accurately deposited onto surfaces and leave consistent trace amounts of explosive or drug when the deposit is dried.

It is a further object of the present invention to provide such reference sample carrier that is compatible with a gas chromatograph with an ion mobility detector or a thermal energy activation detector.

It is a further object of the present invention to provide such reference sample carrier that is compatible with an ion mobility spectrometer that is being used in either the positive ion mode or the negative ion mode.

It is a further object of the present invention to provide such reference sample carrier that, when dried, can be wipe sampled and analyzed according to the instructions of the trace detection equipment manufacturer and the wipe will yield a positive analysis result.

SUMMARY

Briefly, the present invention is a carrier for contraband substances such as explosives and narcotics which does not degrade the contraband substance or the surface on which it is placed. The carrier is intended for use with all types of detectors; when used in conjunction with an ion mobility spectrometer (IMS) the spectrometer can be used in the positive ion mode as well as in the negative ion mode. The carrier preserves the contraband substance, which allows it to be prepared in advance and stored for relatively long periods. It is comprised of off the shelf components, making it inexpensive and easy to prepare. The components are deionized water, Solugel 480, Polyfix 106, SanSurf OMC, and ethyl alcohol.

DESCRIPTION OF THE PREFERRED EMBODIMENT

The reference sample carrier of the present invention is prepared from the following chemicals manufactured by The Collaborative Group, Ltd., East Setauket, N.Y.: Solugel 480 (a mixture of butylene glycol, polyethoxymethacrylate, and dipropylene glycol isoceteth-20 acetate); Polyfix 106 (a mixture of polydecene and polybutene); SanSurf OMC (a mixture of cyclomethicone, dimethiconol, phenyl trimethicone, octyl methoxycinnamate, and phospholipids); and SDA 40-A 190° (ethyl alcohol 95%).

The carrier yields a baseline that will not cause false positive analysis in either positive or negative ion mode when use with an ion mobility spectrometer (IMS) or a gas chromatograph in combination with a chemiluminescent detector (also called a TEA (Thermal Energy Activation) detector).

The carrier has been successfully tested with trace amounts of RDX, PETN, and NG with an IMS in the negative ion mode. The carrier may also be used with TNT; however, the base cream (with no explosive or drugs) will yield an alarm on some IMS instruments. This does not diminish the usefulness of the carrier since the object of the tests is to determine the ability of an operator to get a valid sample to be used in the machine, and the absence of drugs or explosives is immaterial. Cocaine, morphine, and methamphetamine are used with an IMS in the positive ion mode. NG and methamphetamine are quite volatile; however, NG yielded an alarm 2 days after a test sample had been dried for 24 hours, and methamphetamine yielded an alarm 7 days after a test sample had been dried for 24 hours.

The sample carrier of the present invention has the following composition:

|  | Preferred | Range |
| --- | --- | --- |
| Deionized water | 37.0% by weight | 20–50% by weight |
| Solugel 480 | 40.0 | 20–50 |
| Polyfix 106 | 2.0 | 1–20 |
| SanSurf OMC | 1.0 | 1–10 |
| SDA 40-A 190° | 20.0 | 5–50 |

The carrier of the present invention is prepared as follows. With all components at room temperature, dissolve the Solugel 480 in water, using a propeller type stirrer creating a shallow vortex. Slowly add each of the other ingredients individually, stirring for 20 minutes after each ingredient is added. It will be necessary to increase the power of the stirrer to maintain the shallow vortex as the mixture gets thicker as the ingredients are added. After all ingredients are added stir for an additional hour. Add commercially available solutions of the desired explosive or drug and stir for an additional 2 hours. The concentration of the drug or explosive in the final mixture should be as follows:

| Explosives: | | |
| --- | --- | --- |
| RDX | 90 mg/L Preferred | 30–120 mg/L |
| TNT | 90 | 30–120 |
| PETN | 250 | 150–350 |
| NG | 250 | 150–350 |
| Drugs: | | |
| Morphine | 400 | 200–600 |
| Cocaine | 400 | 200–600 |
| Methamphetamine | 400 | 200–600 |

While a range of concentrations has been shown for each of the components, the performance of the carrier may degrade at the extremes of these ranges, hence it is best to remain inside of the extremes of the ranges.

The shelf life of the final mixtures with added drug or explosive has been shown to be at least 5 months at a temperature of less than 120° F.

To prepare a test sample, place 5 microliters of the mixture containing RDX, PETN, TNT, cocaine, morphine, or methamphetamine on a hard surface such as a computer disk case, a zipper tab, luggage pull handle or plastic snap closure, or hard plastic luggage or computer case handle (when the carrier contains NG use 20 microliters). Spread the deposit over an approximately 1 inch diameter circle using a clean plastic spatula and allow the deposit to dry for 24 hours at room temperature. Sample the dry deposit using the method and materials recommended by the manufacturer of the trace detection equipment being tested or evaluated. In order to limit errors to just instrument malfunctions or operator mistakes, the equipment sensitivity settings should remain as normally used. Test results have yielded 100% alarms for each explosive and each drug deposited on one or more of each surface tested using Barringer, Inc. Ionscan 400A. The IonTrack Itemizer yielded consistent results only with RDX. The Thermedics, Inc. EGIS 3000 detectors yielded consistent results on explosives but was not tested with drugs.

It should be noted that the following substitutions can be made for the name brand chemicals listed above: In place of Solugel 480, cellulose gum, Xanthan gum, Carbopol 980, Solugel 240, or Solugel 130 can be used. In place of Polyfix 106, Polyfix 306 can be used. In place of SanSurf OMC, triethanolamine, 2,2 amino-methyl propanol, vitamin E acetate, and other SanSurf compositions can be used. In place of SDA 40-A 190° (ethyl alcohol), isopropyl alcohol, propyl alcohol, methyl alcohol, acetonitrile, methyl ethyl ketone, or acetone can be used. However, substitutions should be used with caution as they may degrade performance.

I claim:

1. A reference sample carrier for contraband substances comprising the following components: deionized water; a mixture of butylene glycol, polyethoxymethacrylate, and dipropylene glycol isoceteth-20 acetate; a mixture of polydecene and polybutene; a mixture of cyclomethicone, dimethiconol, phenyl trimethicone, octyl methoxycinnamate and phospholipids; and ethyl alcohol.

2. A reference sample carrier as in claim 1 wherein said components have the following weight percentages: deionized water, 20–50%; said mixture of butylene glycol, polyethoxymethacrylate, and dipropylene glycol isoceteth-20 acetate, 20–50%; said mixture of polydecene and polybutene, 1–20%; said mixture of cyclomethicone, dimethiconol, phenyl trimethicone, octyl methoxycinnamate and phospholipids, 1–20%; and ethyl alcohol, 0–20%.

3. A reference sample carrier as in claim 1 wherein said components have the following weight percentages: deionized water, about 35%; said mixture of butylene glycol, polyethoxymethacrylate, and dipropylene glycol isoceteth-20 acetate, about 35%; said mixture of polydecene and polybutene, about 5%; said mixture of cyclomethicone, dimethiconol, phenyl trimethicone, octyl methoxycinnamate and phospholipids, about 10%; and ethyl alcohol, about 15%.

* * * * *